United States Patent
Kemper et al.

(10) Patent No.: US 6,804,682 B1
(45) Date of Patent: Oct. 12, 2004

(54) SYSTEM AND METHODOLOGY PROVIDING COMPILER-ASSISTED REFACTORING

(75) Inventors: Christian K. Kemper, Santa Cruz, CA (US); Mark K. Howe, Capitola, CA (US)

(73) Assignee: Borland Software Corporation, Scotts Valley, CA (US)

( * ) Notice: Subject to any disclaimer, the term of this patent is extended or adjusted under 35 U.S.C. 154(b) by 296 days.

(21) Appl. No.: 10/209,283

(22) Filed: Jul. 30, 2002

Related U.S. Application Data

(60) Provisional application No. 60/376,402, filed on Apr. 29, 2002.

(51) Int. Cl.[7] ............................................. G06F 17/30
(52) U.S. Cl. .................................. 707/103 R; 717/120
(58) Field of Search ............................... 707/1, 2, 3, 4, 707/5, 6, 7, 8, 9, 10, 100, 101, 102, 103, 104.1; 717/114, 151, 130, 128, 148

(56) References Cited

U.S. PATENT DOCUMENTS

| | | | |
|---|---|---|---|
| 5,870,753 A | * 2/1999 | Chang et al. | ............ 707/103 R |
| 6,505,211 B1 | * 1/2003 | Dessloch et al. | ........ 707/103 Y |
| 6,662,359 B1 | * 12/2003 | Berry et al. | ................. 717/130 |
| 6,675,375 B1 | * 1/2004 | Czajkowski | ................. 717/151 |
| 6,704,926 B1 | * 3/2004 | Blandy et al. | ............... 717/148 |
| 6,704,927 B1 | * 3/2004 | Bak et al. | .................... 717/148 |

* cited by examiner

*Primary Examiner*—Diane D. Mizrahi
*Assistant Examiner*—Yicun Wu
(74) *Attorney, Agent, or Firm*—John A. Smart; G. Maok Riddle

(57) ABSTRACT

A system providing an improved method for compiler-assisted refactoring of a software application is described. Upon receiving a request for refactoring of a software application (e.g., changing a given symbol of the application), the binary files of the application are parsed to identify those binary files containing references to the given symbol. The source files of the identified binary files are then retrieved and fed into a compiler. The compiler is used to generate a list of all uses of the given symbol in the software application. This list includes not only the text name of the symbol, but also type information and position information regarding its location(s) in the source file. Based upon the list, changes are applied to the software application.

47 Claims, 8 Drawing Sheets

SYSTEM AND METHODOLOGY PROVIDING COMPILER-ASSISTED REFACTORING

RELATED APPLICATIONS

The present application is related to and claims the benefit of priority of the following commonly-owned provisional application(s): application serial No. 60/376,402, filed Apr. 29, 2002, entitled "System and Methodology Providing Compiler-Assisted Refactoring", of which the present application is a non-provisional application thereof. The disclosure of the foregoing application is hereby incorporated by reference in its entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to a system providing methods for facilitating development and maintenance of software applications or systems, with particular emphasis on a compiler-assisted method for refactoring of software systems.

2. Description of the Background Art

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks. While it is possible for humans to compose meaningful programs in machine code, practically all software development today employs one or more of the available programming languages. The most widely used programming languages are the "high-level" languages, such C, Pascal, or more recently Java. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C "object module," which includes instructions for execution ultimately by a target processor, or a compiled Java class, which includes bytecodes for execution ultimately by a Java virtual machine. A Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms which an application is to run. The Java interpreter executes Java bytecode directly on any machine for which the interpreter and runtime system of Java have been ported. In this manner, the same Java language bytecode runs on any platform supported by Java.

Conventionally, creation of a software program or system includes creation of individual source code modules. This approach simplifies program development by dividing functionality available in the program into separate source modules. When multiple source modules are employed for creating a program, interdependencies between the individual modules often exist. Program logic in one module can, for instance, reference variables, methods, objects, and symbols imported from another module. By the very same token, that module can also export its own methods, objects, and symbols, making them available for use by other modules.

"Visual" development environments, such as Borland's JBuilder™, are the preferred application development environments for quickly creating production applications. Such environments are characterized by an integrated development environment (IDE) providing a form painter, a property getter/setter manager ("inspector"), a project manager, a tool palette (with objects which the user can drag and drop on forms), an editor, and a compiler. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects. After the program code has been developed, the compiler is used to generate binary code (e.g., Java bytecode) for execution on a machine (e.g., a Java virtual machine).

Although visual development environments enable applications to be created quickly, problems remain with the development, implementation, and maintenance of production applications. One problem is that when a large software program or application evolves over time it is common that the initial design gets lost as features that were not in the original specification are added to the application. One way of dealing with this problem of making changes is to design everything with the maximum amount of flexibility. However, this will often lead to unnecessary complexity in the software application, as it is unknown beforehand which parts of the application will require this additional flexibility. Irrespective of how well a system is initially designed or developed, the system is typically modified from time to time during its useful life to improve performance, to accommodate changing needs, to make the system easier to maintain, or for various other reasons. However, during the process of adding features not envisioned in the original specification or otherwise making modifications to the system, one must track how particular terms are defined and used by the system to properly develop the system modifications and to avoid introducing errors during this development process. Specifically, because of interdependencies between modules, when a particular source module is modified (e.g., edited by a developer), the developer must ensure that such modifications are compatible with the other modules of the program. A particular concern is, therefore, that a given change might "break" the system, because the change is incompatible with other, dependent modules of the system.

"Refactoring" is a practice of making structured changes to software applications or systems which add the desired flexibility, but keep the functionality of the system the same. Refactoring involves taking small individual steps that are well defined and that can be applied in succession to yield a more significant change in the application. For example, a developer may wish to perform a "rename refactoring" to change the name of a particular module (e.g., a class name in a Java program). In order to make this change, the user must locate the definition of this class (i.e., the source code for the class) as well as all uses of the class in other portions of the system. In the case of a class name in a Java program, the class name is typically used not only for defining a variable, but also for constructing instances (or objects) of that class and accessing static members of the class (i.e., class variables). Another example of refactoring may involve moving a specified class to a new package (referred to as "move refactoring").

Refactoring of a system may be small or extensive, but even small changes can introduce errors or "bugs" into the system. Accordingly, refactoring must be done correctly and completely in order to be effective. Good refactoring requires a mechanism for quickly and accurately identifying definitions and usage of a given symbol in a plurality of source files. The "symbols" that may be involved in refactoring include, for example, package names, class names, interfaces, methods, fields, variables, and properties. Identification of definitions and usage of a given symbol enables refactoring to be performed responsibly and durably so that no bugs are introduced and no behavior is changed beyond the desired improvements in features, performance, and/or maintainability.

The simplest approach for handling refactoring is to use a textual search and replace. However, this approach has the disadvantages of being both slow and inaccurate as refactoring involves more than a simple search and replace task. References must all be accounted for and properly handled, while patterns must be recognized so that, for instance, overloaded names are handled correctly. When a rename refactoring is performed on an overloaded class name, the class's new name must be reflected in the class declaration and in every instance of that class and every other reference to that class. However, the new name must only be reflected in the target class, not in the other classes that share its original name or their declarations, instances, references, methods, and the like. For instance, a class name may also be used as part of a method name in another class. A simple search and replace cannot be performed as one must understand the context in which each instance of the name or symbol is used in various portions of a large system. All told, a textual search and replace is a very inefficient tool for handling a complex operation of this nature, as it requires a user to manually review each usage of the target symbol (e.g., class name) to determine whether or not the symbol should be changed in that particular instance.

A slightly more elaborate approach involves combining the textual search with some language knowledge in the form of a source analysis tool. This type of source analysis tool may enable a user to at least narrow down possible candidates for replacement. Another approach is to use a source analysis tool to build an additional cross-reference index of the usage of symbols in the source code. Unfortunately, building an additional cross-reference index requires a separate pass to analyze the structure of the source code, before performing the refactoring. In addition, a problem with both of these approaches is that building this type of automated source analysis tool for a particular programming language largely involves recreating the compiler for the language in order to understand the context in which a particular symbol or token is used in a program. However, recreating the compiler does not take advantage of the native compiler that is available for the language. In addition, the process of attempting to recreate a compiler creates the potential for introducing errors as a result of differences between the newly created compiler and the native compiler that was used in development and implementation of the system.

A better approach is sought for refactoring which leverages a proven compiler that is certified for the language and is used in program development and implementation. The present invention fulfills this and other needs.

GLOSSARY

The following definitions are offered for purposes of illustration, not limitation, in order to assist with understanding the discussion that follows.

Bytecode: A virtual machine executes virtual machine low-level code instructions called "bytecodes." Both the Sun Microsystems Java virtual machine and the Microsoft .NET virtual machine provide a compiler to transform the respective source program (i.e., a Java program or a C# program, respectively) into virtual machine bytecodes.

Compiler: A compiler is a program which translates source code into binary code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A Java compiler translates source code written in the Java programming language into bytecode for the Java virtual machine.

Interpreter: An interpreter is a module that alternately decodes and executes every statement in some body of code. A Java runtime interpreter decodes and executes bytecode for the Java virtual machine.

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference.

Refactoring: Refactoring is the process of making small, structured changes to improve the internal structure of an existing software system without changing its observable behavior. For example, if a user wants to add new functionality to a software system, he or she may decide to refactor the program first to simplify the addition of new functionality and to make the program easier to maintain over time. A software system that undergoes continuous change, such as having new functionality added to its original design, will eventually become more complex and can become disorganized as it grows, losing its original design structure. Refactoring of a software system facilitates building on an existing program in a structured manner that avoids introducing new bugs and problems into the system.

SUMMARY OF THE INVENTION

A system providing an improved method for compiler-assisted refactoring of a software application is described. Upon receiving a request for refactoring of a software application (i.e., changing a given symbol or element of the application) from a developer or user, the binary files of the application are parsed to identify those binary files containing references to the given symbol or element. The source files of the identified binary files are then retrieved and fed into a compiler. The compiler is used to generate a list of all uses of the given symbol or element in the software application. This list includes not only the text name of the symbol or element, but also type information and position information regarding its location(s) in the source file. Based upon the list, changes are applied to the software application.

When source code changes are made to a software system, the system and method of the present invention may be utilized to locate dependencies to such source code changes. When a source code change is received, the binary modules of the software system are parsed to determine which binary modules contain dependencies to the source code change. The corresponding source files of the binary modules are then retrieved. The compiler is used to identify each dependency present in the retrieved source code.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as the Microsoft® Windows operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-based Implementation

A. Basic system hardware (e.g., for desktop and server computers)

Figure 1:
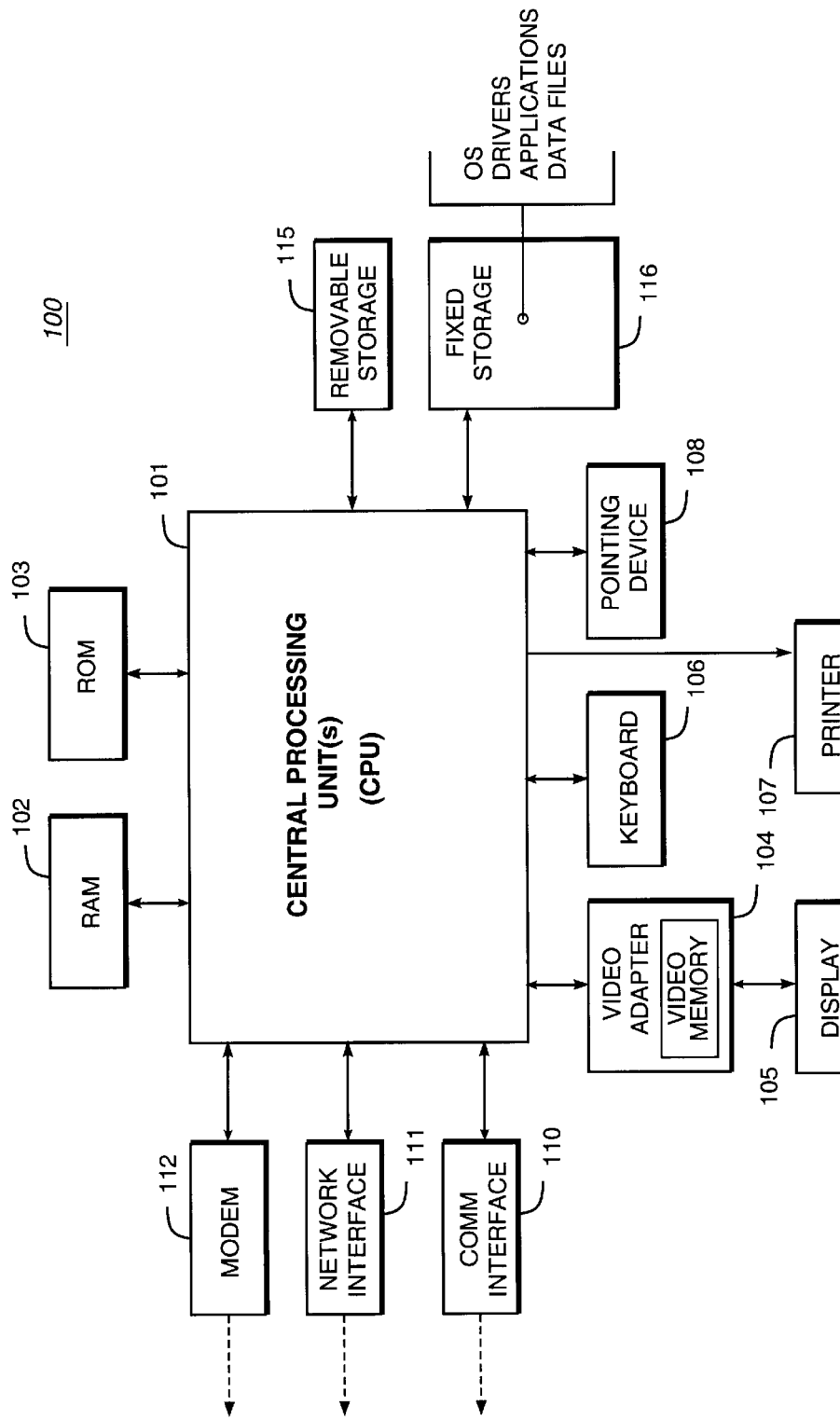
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56 K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic system software

Figure 2:
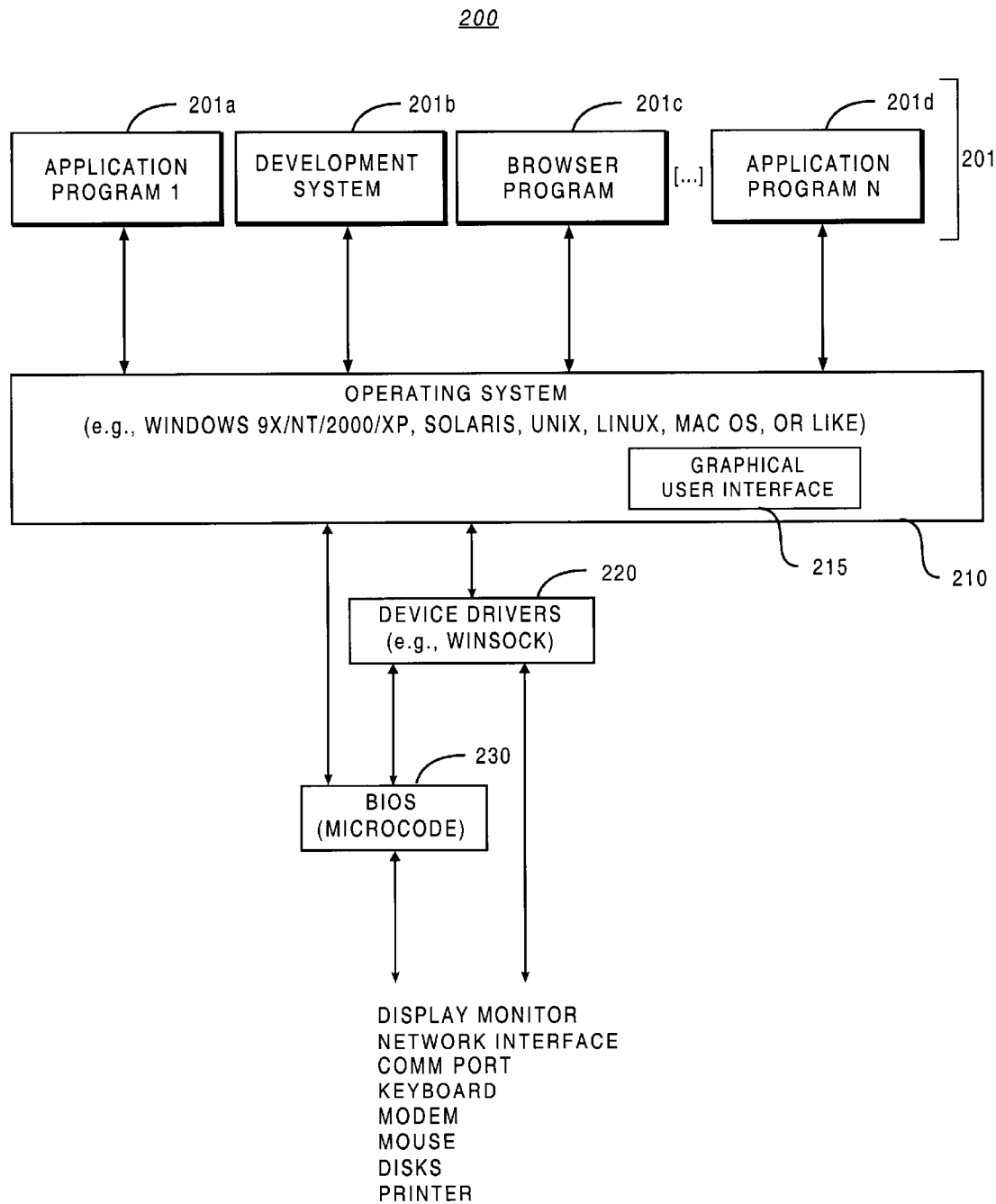
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists at least one computer running applications developed using the Java programming language. The present invention, however, is not limited to any particular environment or device configuration. In particular, use of the Java programming language is not necessary to the invention, but is simply used to provide a framework for discussion. Instead, the present invention may be implemented in any type of system architecture or processing environment capable of supporting the methodologies of the present invention presented in detail below.

C. Java development environment

Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. A typical Java system comprises the following set of interrelated technologies: a language specification; a compiler for the Java language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Figure 3A:
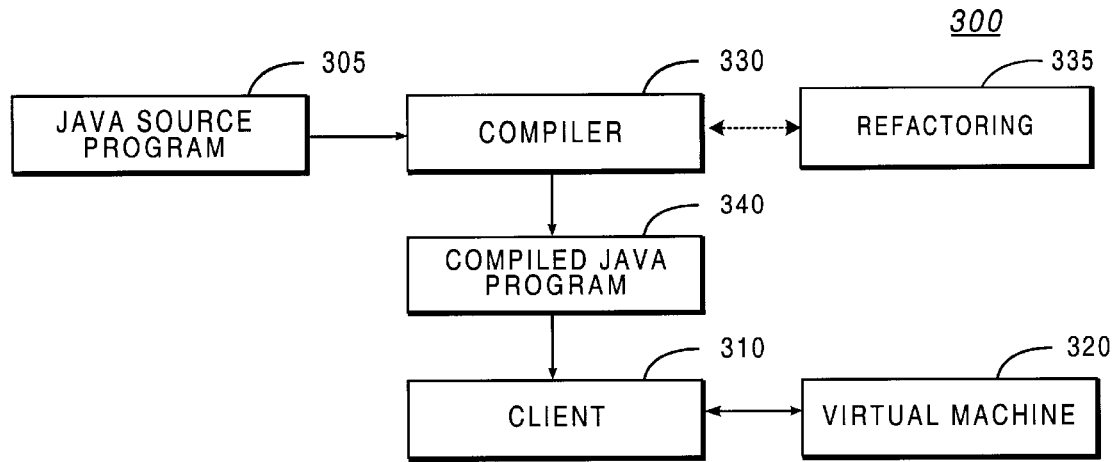
FIG. 3A is a block diagram of a Java development system suitable for implementing the present invention.

Shown in further detail in FIG. 3A, a Java development system 300 suitable for implementing the present invention includes a client 310 which employs a virtual machine 320 for executing programs. In particular, the client 310 executes a "compiled" (i.e., bytecode or pseudo-compiled) Java program 340, which has been created by compiling a Java source code program or script 305 with a Java compiler 330. Here, the Java source code program 305 is an application program written in the Java programming language; the pseudo-compiled program 340, on the other hand, comprises the bytecode emitted by the compiler 330. The virtual machine 320 includes a runtime interpreter for interpreting the Java bytecode program 340. During operation, the client 310 simply requests the virtual machine 320 to execute a particular Java compiled program.

Also shown at FIG. 3A is the modification of the development system 300 to implement the present invention. As shown, a refactoring module 335 is provided for compiler-assisted refactoring of a software program. The compiler-assisted refactoring operations of the system are described in detail below.

Figure 3B:
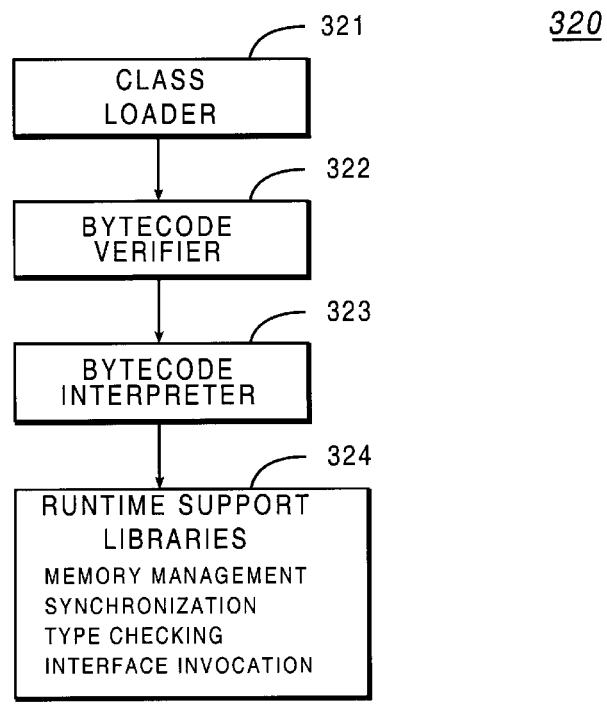
FIG. 3B is a block diagram of a virtual machine illustrated in the Java development system of FIG. 3A.

As shown in FIG. 3B, the virtual machine 320 comprises a class loader 321, a bytecode verifier 322, a bytecode interpreter 323, and runtime support libraries 324. The class loader 321 is responsible for unpacking the class file which has been requested by a client. Specifically, the class loader 321 will unpack different sections of a file and instantiate in-memory corresponding data structures. The class loader will invoke itself recursively for loading any superclasses of the current class which is being unpacked.

The bytecode verifier 322 verifies the bytecode as follows. First, it checks whether the class has the correct access level. Since the class will access other classes for invoking their methods, the bytecode verifier 322 must confirm that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These static variables comprise the variables which are present only once (i.e., only one instance), for all objects of the class.

Runtime support libraries 324 comprise functions (typically, written in C) which provide runtime support to the virtual machine, including memory management, synchronization, type checking, and interface invocation. At the client machine on which a Java application is to be executed, runtime support libraries 324 are included as part of the virtual machine; the libraries are not included as part of the Java application. The bytecode which is executed repeatedly calls into the runtime support libraries 324 for invoking various Java runtime functions.

In the currently preferred embodiment, the Java development system 300 may be provided by Borland JBuilder® 7.0, available from Borland Software Corporation of Scotts Valley, Calif. Further description of the development system 300 may be found in "Building Applications with JBuilder (Version 7)," available from Borland Software Corporation of Scotts Valley, Calif., the disclosure of which is hereby incorporated by reference. The following briefly describes the Java-based visual development interface provided by the system.

D. Development Interface

Figure 4:
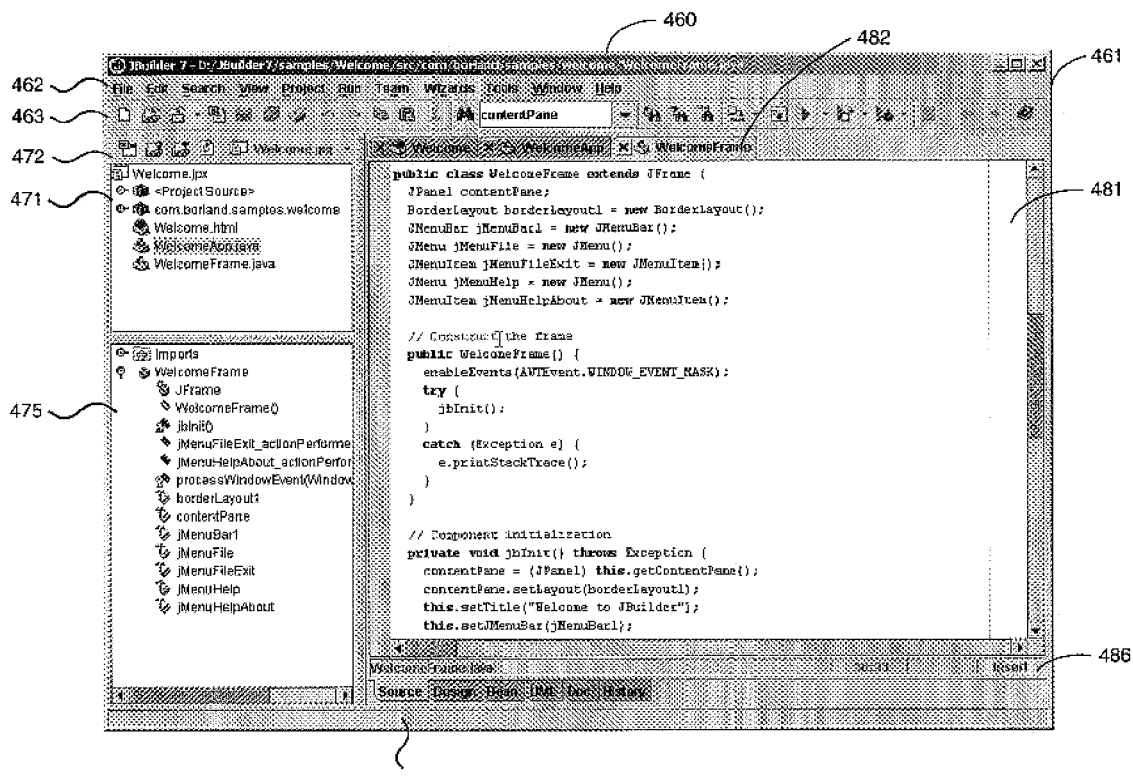
FIG. 4 illustrates a preferred interface of a Java-based visual development or programming environment provided by the Java development system.

FIG. 4 illustrates a preferred interface of a Java-based visual development or programming environment 460 provided by the system. As shown, the programming environment 460 comprises a main window 461, a project pane 471, a structure pane 475, and a content pane 481 (showing the editor). The main window 461 itself includes a main menu 462 and a main toolbar 463. The main menu 462 lists user-selectable commands, in a conventional manner. For instance, the main menu 462 invokes "File", "Edit", "Search", "View" submenus, and the like. Each submenu lists particular choices which the user can select. Working in conjunction with the main menu, the main toolbar 463 provides the user with shortcuts to the most common commands from the main menu, such as opening or saving a project. The main toolbar 463 is displayed under the main menu and is composed of smaller toolbars grouped by functionality. The main toolbar is configurable by the user for including icons for most of the menu commands.

To develop a software program in the development environment, a user typically first creates a "project" to organize the program files and maintain the properties set for the program. The project pane 471 contains a list of the open project(s) and a tree view of the contents of the active project. As shown at FIG. 4, the active project file is the top node in the project pane 471 and the content pane 481 displays the contents of the active project file. In the currently preferred embodiment, the project pane 471 also includes a project pane toolbar 472 which includes buttons for closing a project, adding files or packages (e.g., by opening an "Add Files or Packages to Project" dialog box), removing files from a project, and refreshing the project (e.g., searching for source packages for the project).

The structure pane 475 displays the structure of the file currently selected in the content pane 481. The file structure is displayed in the form of a tree showing the members and fields in the selected file. When appropriate, the structure pane 475 also displays an "Errors" folder (not shown) containing any syntax errors in the file as well as an "Imports" folder (as shown at the top of the structure pane 475) containing a list of imported packages. In addition to providing a view of the structure of the class, the structure pane facilitates navigating to a class, or its methods or members, in the source code.

The content pane 481 displays all open files in a project as a set of tabs. Files may be opened in the content pane 481 by selecting the file from the project pane 471. The name of each open file is displayed on file tabs 482 at the top of the content pane. As shown, multiple file tabs 482 may provide access to various open files. A user may select a file tab (e.g., the "Welcome Frame" as shown at FIG. 4) to display a particular file in the content pane 481. The content pane provides a full-featured editor that provides access to text (i.e., source code) in a given project.

The content pane 481 provides access to various file views as well as status information by way of file view tabs 485 and a file status bar 486. Each of the file view tabs 485 shown at the bottom of the content pane provides a different view of the open file. The file view tabs 485 are context sensitive. Only tabs appropriate to the file open in the content pane appear below its window. For instance, a visually designable .java file typically has several tabs, including "Source", "Design", "Bean", "UML", "Doc", and "History" as shown at FIG. 4. A user may select the "Source" tab to view source code or the "UML" tab to view Uniform Modeling Language (UML) diagrams for a class or package. The content pane 481 also includes a file status bar 486 which is displayed immediately above the file view tabs 485. The file status bar 486 displays information specific to the current file, such as the name of the file, the cursor location (line number and column), and the insertion mode in a text file.

The following description will focus on those features of the development system 300 which are helpful for understanding the methodology of the present invention for compiler-assisted refactoring of a software application.

II. Compiler-assisted Refactoring

A. Overview of compiler-assisted refactoring

The present invention provides native-compiler support for refactoring. Here, the approach is to use the underlying development system's actual compiler (e.g., JBuilder's actual Java compiler) to automate and facilitate refactoring of software systems or applications, instead of using a special-purpose diminutive compiler. In this manner, the refactoring implementation may employ the underlying development system's own proven, robust compiler. As previously described, during the process of making structured changes to a software system (i.e., refactoring), a user must identify all instances in which a particular term or symbol is used as well as the context in which such term or symbol is used. The system and methodology of the present invention assists a user in properly parsing and understanding the context in which particular terms or symbols are utilized, thereby enabling refactoring to be performed more efficiently and reliably.

A large software application typically involves tens or hundreds of thousands of lines of code. A system of this size is generally composed of a large number of smaller components. For example, a system or application written in the Java programming language typically includes a large number of different packages and classes that are contained in various different files. The various component packages and classes are linked together and compiled into binary form in order to implement and run the software system (e.g., on a Java virtual machine). Accordingly, an initial problem to be addressed in changing the system (i.e., refactoring) is to locate the source files that contain the term(s) or symbol(s) of interest. For example, a user may wish to rename a particular class written in the Java programming language, or one or more of its elements.

The system of the present invention enables the source files containing the dependencies (e.g., the targeted class) to be identified by evaluating the binary output of a compilation of the system. In this example involving a particular Java class, this evaluation process looks for references to the targeted class, enabling identification of one or more source candidate files which may contain the items of interest. These source candidate files may then be further inspected using the compiler constructed in accordance with the present invention, as hereinafter described. In this first step of identifying the target source files from a binary representation of the system, the debug information contained in the class files is used to identify source candidates. After a list of source candidates has been identified from the binary representations, the compiler is then used to narrow the list of source candidates by identifying references to a certain class as discussed below.

After the candidate source files have been identified, the system of the present invention is used to generate a syntactical representation of the candidate source files, in the form of a "parse tree". Next, the compiler's typing phase is used to generate an attributed (or annotated) parse tree which contains annotations to the references. The annotated parse tree not only contains the short name references to the object or symbol of interest, but also associated type information to better enable a determination to be made about whether a particular reference is, in fact, a symbol of interest. The short name reference indicates a potential match, however it generally cannot be determined whether or not it is in fact a match without examination of the context. After the annotated parse tree has been generated, it may then be traversed to locate references to particular symbols or objects of interest and evaluate not only the short name, but also the associated type information. The annotated parse tree also includes position information to facilitate locating and making changes to the applicable source file. In effect, the parse tree contains a mapping to the text (i.e., the source code) that can be used to make changes to the text file.

B. Summary of basic approach

The approach of the present invention for improved refactoring may be summarized as follows. When a developer or user compiles the source code of a software system, the resulting object files contain a compact representation of the usage of symbols inside the source files. In the case of a system written in Java, the text or character names of symbols generally survive compilation, which is not the case in many other programming languages. Additional dependencies that are contained in the source files, but are not part of the object files are also saved in auxiliary files alongside the object files for later retrieval. This information typically consists of declared but unused program entities that may have to be updated in case of a refactoring.

The following pseudocode is a high level description of how the system of the present invention discovers candidate source files for refactoring using the repository and then uses the system's compiler to find the actual occurrences of the symbols or object of interest within the candidate source files.

```
 1: given an object (method, field, class) OBJ, which is defined in
 2: class CLASSNAME:
 3:
 4:     public void findAllOccurences(Obj obj, String classname) {
 5:         // get a instance of Repository,
 6:         // which is a database containing dependencies
 7:         // between classes
 8:         Repository repository =
                ((JBProject)project).getRepository();
 9:         // get the database entry for class classname
10:        ClassEntry classEntry =
                repository.getClassEntry(classname);
11:        // get the reverse dependencies, giving us a list
12:        // of candidate classes that are using class classname
13:        Collection candidates =
                classEntry.getReverseDependencies();
14: // Get a set of sourceCandidates
15:        Set sourceCandidates = new Set();
16:        for (Iterator i = candidates.iterator(); i.hasNext();) {
17:            ClassEntry candidate = (ClassEntry)i.next();
18:            SourceEntry sourceCandidate = candidate.getSource();
19: sourceCandidates.add(candidate.getSource());
20: }
21:
22:        // go through all source candidates to determine if
23:        // any of them use the object obj
24:        for (Iterator i = sourceCandidates.iterator(); i.hasNext();) {
25:            SourceEntry sourceCandidate = (SourceEntry)i.next();
26:            doSearch(sourceCandidate, Obj obj);
27:        }
28:    }
29:
30:    // find all occurences of obj within source file source
31:    void doSearch(SourceEntry source, Obj obj) {
32:        // attribute the source. This will use the compiler
33:        // to resolve all names within that source to accurately
34:        // determine occurences of obj
35:        source.attribute();
36:
37:        AST[ ] result = source.findObjOccurences(obj);
38:        for (int i = 0; i < result.length; i++) {
39:            reportMatchFound(source, result [i]);
40:        }
```

As illustrated in the above pseudocode, for a given symbol or object (obj) from an object file (e.g., a .class file), the method of the present invention locates all positions in the source files where the symbol is used. As shown at line 8, an instance of the repository, which is a database containing relationships between classes, is instantiated. At lines 10–19, the set of candidate source files that have a dependency on the identified class is determined from the repository. After the candidate source files have been identified, these source files are further examined to determine which of these files have a dependency on the given object as shown at lines 22–26. For each occurrence of the object in a candidate source file, the compiler is used to attribute the source as provided at lines 30–35. The result is an annotated list of all occurrences of the object inside the source files where the object is used. The processes involved in the refactoring of a software application using the system and method of the present invention will now be described in greater detail.

C. Processes involved in refactoring an application

Figure 5A:
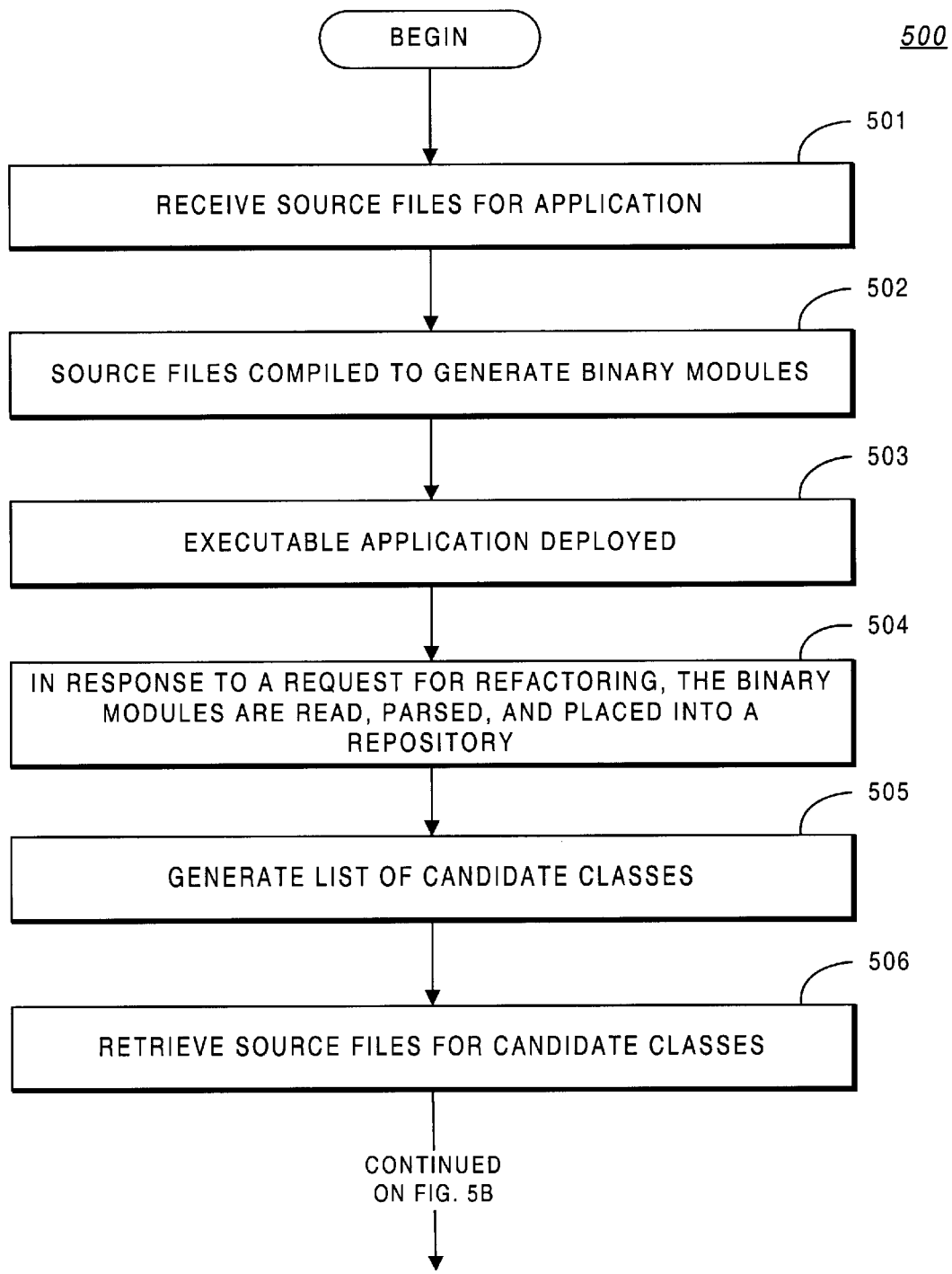
FIGS. 5A–B comprise a single diagram illustrating at a high level the processes involved in refactoring a software application using the system and method of the present invention.
Figure 5B:
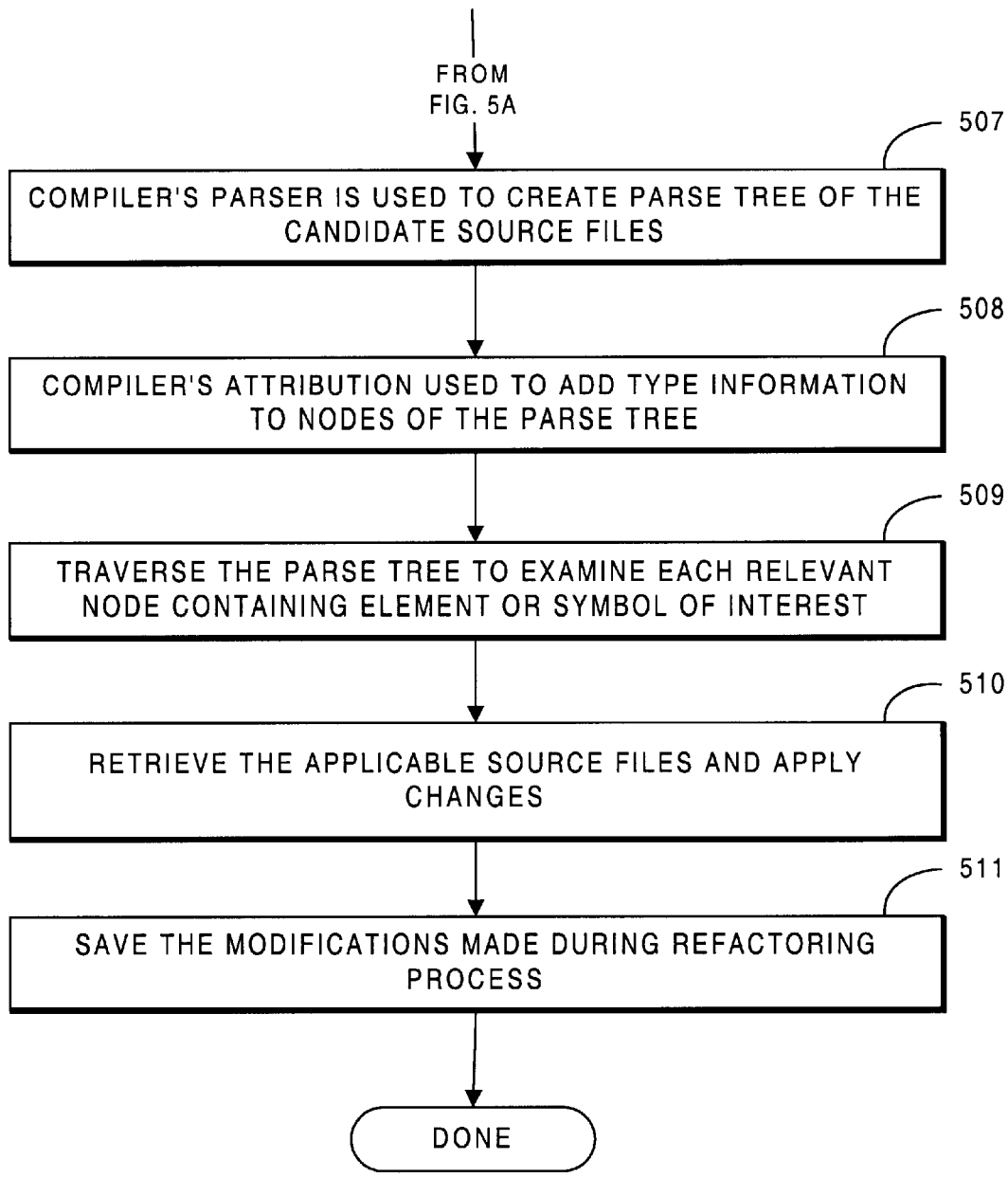

FIGS. 5A–B comprise a single diagram 500 illustrating at a high level the processes involved in refactoring a software application using the system and method of the present invention. The processes involved in compiling a software application into binary format for execution on a computer are first described. The processes involved in refactoring the application are then illustrated in typical sequential order. The following discussion will use as an example the refactoring of a software application written in the Java programming language. However, the reference to Java is only to provide a framework for discussion and the system and method of the present invention may also be used for refactoring of software systems written in a variety of programming languages.

As shown, the process begins at block 501 with one or more source files or listings of a software system. The source files may, for instance, comprise a particular software application that has been developed to perform particular tasks (e.g., a transaction processing system). The source files may have been developed using a visual development system such as JBuilder. Alternatively, the source files may be developed using a text editor or another type of development tool. After the source files for the system have been developed, the developer compiles the source files using a complier. The compiler takes the source files and "compiles" or generates binary modules or files from the source files as shown at block 502 at FIG. 5A.

Compilation of the source files typically involves several related operations. First, the input stream is scanned to break the source code files into a sequence of tokens or meaningful groups of characters. After scanning, the sequence of tokens is parsed to generate an abstract syntax tree or "parse tree" representation of the source code. The parsing process also generally includes resolution of symbol declarations as well as semantic analysis to verify the source code as a sequence of valid statements or expressions in the applicable programming language. The compiler also builds a symbol table and other supporting data structures for annotating each node in the parse tree with parse or type information. The output from these scanning and parsing operations is a parse tree in which nodes are annotated with either type or symbol information. Following these scanning and parsing operations, the annotated parse tree is usually optimized by a code optimizer to optimize data references globally within a program. After optimization, a code generator generates instructions or binary code for the target processor. Code generation may also include additional machine-dependent optimization of the program. Following compilation, the object code may also be "linked" or combined with runtime libraries (e.g., standard runtime library functions) to generate executable program(s), which may be executed by a target processor (e.g., processor 101 of FIG. 1). The runtime libraries include previously compiled standard routines, such as graphics, input/output (I/O) routines, startup code, math libraries, and the like. The result of the above process is that the high level source code files have been translated into machine readable binary code which may then be executed.

As shown at block 503, the compiled binary modules or files (e.g., .class files in the case of a program written in Java) represent an executable software application that may then be deployed and operated. After the software system has been compiled, a user may, from time to time, wish to make changes to the system (e.g., to add new features or for other reasons). When changes are to be made to the software application, the user may utilize the system and methodology of the present invention for compiler assisted refactoring. In response to a request from a developer or user for refactoring of a program or system, the binary modules (e.g., .class files) are read, processed, and placed into a repository as shown at block 504. As part of this process, the binary modules are parsed and a cross reference list is created. The cross reference list contains a list of references to the given binary modules in other binary modules (e.g., other .class files) of the application. The cross reference list is stored in the repository together with the binary modules. The symbols or references contained in a given class file are discerned or determined. This reference information is then entered in the repository, so that for a given source file it can be determined what high level cross references (e.g., dependencies among Java .class files) are made among the component source files (e.g., .java files) of the system. This repository information may then be used to determine the list of source candidates to be examined as described below.

After reference information has been determined, the list of forward references for a given class which are stored in the repository may be used to obtain a list of the other classes that refer to such given class as shown at block 505 at FIG. 5. By reversing all of the forward references to a particular class, all of the classes that are dependent on this particular class may be determined. For example, if one wishes to change the name of a particular .class file, this information enables all other .class files that are using (or referencing) this particular file to be identified. In the currently preferred embodiment in the Java programming language, the reference information stored in the repository includes the class name, the source name, and all the .class files that are used by this class (i.e., all of the forward references). In this manner, the candidate source files which are using this class may be determined and retrieved as provided at block 506.

The candidate source files are then fed into the compiler. As shown at block 507, the compiler's parser is used to create "parse tree" representations of these candidate source files. The parse trees that are created include position information for each node of the parse trees indicating the location in the source file of a given symbol or reference. The compiler's type attribution is also used to determine type information for such reference as shown at block 508. After the annotated parse trees containing type information and line information have been generated, the parse trees are traversed to examine each instance of a particular symbol or element of interest (i.e., each relevant node of the parse tree) as shown at block 509. Based upon the text name and the type information of a given symbol in the annotated parse trees, it is determined as to whether or not that particular symbol (or element) is a dependency that needs to be changed as part of the refactoring process. If this information indicates that a particular element needs to be modified, the position information is used (i.e., the position information in the source file annotated on a parse tree node) to locate that element in the source file. The source file is then retrieved and the change is applied to that particular element of the source file as shown at block 510. Additional elements or symbols may then be examined and modified in a similar fashion until the refactoring process has been completed. After the refactoring process has been completed, the modifications can be saved as shown at block 511. For most types of refactorings, the currently preferred embodiment provides the user with the option to view the modifications made during the refactoring process before saving the modifications. After the modifications have been saved, the user may also recompile the program to verify successful implementation of the modifications, if desired.

D. Refactoring Code Symbols

1. Types of Refactoring Supported

The currently preferred embodiment of the present invention supports a number of different types of refactorings, including "optimize imports", "rename refactoring", "move refactoring", "change parameters", "introduce variable", "extract method", and "surround with try/catch". Each of these different types of refactorings will now be briefly described.

a) Optimize imports

An "optimize imports" refactoring rewrites and reorganizes import statements according to the custom settings established in the properties for a project (e.g., properties established by the developer or user of a particular application). An optimize imports refactoring also removes any import statements that are no longer used in the code.

b) Rename refactoring

A "rename refactoring" applies a new name to a package, class, method, field, local variable, or property, ensuring that all references to that name are correctly handled. Rename refactoring a constructor renames the class. Rename refactoring is far more than a search and replace task; references must all be accounted for and properly handled while patterns must be recognized so that overloaded names are handled correctly. For example, when a rename refactoring is performed on an overloaded class name, the class's new name must be reflected in the class declaration and in every instance of that class and every other reference to that class. However, the new name must only be reflected in the target class, not in the other classes that share its original name or their declarations, instances, references, etc.

For packages, rename refactoring renames the specified package. Package and import statements in class files are updated. The package, subpackages, and class source files are moved to the new source directory and the old directory is deleted. In the currently preferred embodiment, the following code symbols can be rename refactored.

| Code Symbol | Refactoring allowed | Description |
|---|---|---|
| Package | Package | Rename refactoring a package renames the package and the entire sub-tree of packages. The package name cannot already exist in the project. |
| Class, inner class or interface | Rename, Move | Rename refactoring an outer public class renames the source file. If the source file name already exists in the current package, the refactoring is prevented. If the class is not the outer public class and there is another class of the desired new name, the class is not renamed. Move refactoring a class moves that class to a new package if the new package does not already contain a source file of the new name. The class must be the top level public class. |
| Method | Rename | Rename refactoring a method renames the method and all references to that method. The method can be renamed in all classes that this class inherits from or in all classes in the hierarchy for the class. A forwarding method can be created. |
| Field | Rename | Rename refactoring a field renames the field to a new name. The new name cannot already exist in the class that declared the original name. If there are scope conflicts between the new name and the old name, then the this keyword is added to the beginning of the new field name. A warning is displayed if the new name overrides or is overridden by an existing field in a superclass or subclass. |
| Local Variable | Rename | Rename refactoring a local variable renames the variable to the new name. The new name cannot already exist in the class that declared the original name. |
| Property | Rename | Rename refactoring a property renames the property as well as its getter and setter. The new name cannot already exist in the class that declared the original name. | c) Move refactoring

A "move refactoring" is available for moving classes. Move refactoring moves a specified class to a new package. Move refactoring is only allowed on a top-level public class. The package the class is being moved to cannot already contain a source file of the new name. The refactoring must update the declaration of the class, as well as all the usages of that class.

d) Change parameters

A "change parameters" refactoring allows a user to add, rename, delete and re-order a method's parameters. A newly added parameter may be edited before the dialog creating the parameter is closed; however, an existing parameter cannot be edited.

e) Extract Method

An "extract method" refactoring turns a selected code fragment into a method. The system moves the extracted code outside of the current method, determines the needed parameter(s), generates local variables if necessary, and determines the return type. It inserts a call to the new method in the code where the code fragment resided.

f) Introduce Variable

An "introduce variable" refactoring allows the result of a complex expression, or part of the expression, to be replaced with a temporary variable name that explains the purpose of the expression or sub-expression.

g) Surround with try/catch

A "surround with try/catch" refactoring adds a try/catch statement around a selected block of code. It detects all checked exceptions in a block and adds specific blocks for each checked exception.

2. Access to Refactoring Features

The refactoring features of the currently preferred embodiment are accessible from the development system's editor context menu, editor menu, search menu, and UML diagram context menu. Before a refactoring, a user can view, by category, all locations in the current project where the selected symbol is referenced, and navigate to the symbol's definition. If the refactoring cannot be completed, the user interface provides warning and error messages to help explain the problem. In the currently preferred embodiment, warnings do not stop the refactoring. However, if an error is encountered, the refactoring is prevented. For example, a refactoring might be prevented if a file is read-only or if a new name that is selected already exists. Single file refactorings (for example, extract method and introduce variable) do not display output unless there are errors or warnings.

Exemplary refactoring tools provide extensive information to the user about the refactoring process, including:

| | |
|---|---|
| Limitations reporting | Checks for conditions where a refactoring might encounter problems. For example, determines if needed dependency information is missing or out-of-date, if a file is read-only, or if a class file does not exist. |
| References discovery | Finds all source files containing dependencies. The exact source position is located. |
| Validation | Determines if the new name is legal. For example, the name might already be in use or contain illegal syntax. |
| Source tree updating | Physically moves a directory or a file within the source tree for a class move refactoring or a package rename refactoring. The system also updates import statements as needed for any dependencies. |
| Reference renaming | Renames references with the new name. |

3. Setting up for References Discovery and Refactoring

There are several steps that a user may need to perform before performing a refactoring. The currently preferred embodiment provides an option for loading all library relationships, allowing the system to discover all references. To find all references to a symbol, the system should be compiled with this option for loading references from project libraries enabled. Loading all library references is not required; it may slow down both the compilation and the refactoring process. However, if the library references are not loaded, all references to a symbol may not be discovered using the "Find References" command described below. Additionally, before performing a refactoring, it is advisable to ensure that the class files are up-to-date by compiling the source files.

4. Learning About a Symbol Before Refactoring

Before a user performs a refactoring, such as a rename refactoring or a move refactoring, the currently preferred embodiment provides several ways for learning about a given symbol. For example, a developer can use the system to find the definition of a symbol as well as all references to the symbol; that is, all source files that use the symbol.

A user can also issue a "Find Definition" context menu command to determine where a given symbol is defined. To find a symbol's definition, a user is required to compile the application before using the "Find Definition" command to locate the file containing the definition. In addition, the class that includes the definition must be on the import path or in the same package as the symbol that is of interest. In response to the "Find Definition" command, the source file where the symbol is defined is opened in the editor of the visual development system. If the symbol is an instance of a class, the class is opened in the editor, with the cursor placed on the class declaration. If the symbol is a method, the class that defines the method is opened in the editor, with the cursor placed at the start of the method signature. If the symbol is a variable, and the variable is defined in the open class, the cursor moves to the variable definition. If the variable is public and defined in another class, the class is opened in the editor with the cursor placed on the definition.

Before refactoring, a developer might also want to find all source files using a selected symbol. To locate all references to a symbol, the application must be compiled and the references must be loaded from project libraries as previously described. If a developer has compiled the source files and loaded the references, he or she may select the symbol in the editor and enter the "Find References" command. References located in response to the command are displayed on the "Search Results" tab of the message pane. Class and method references are sorted by category. Field and local variable references are sorted by file name. The "Find References" command cannot currently be used to locate references for a package or a property. The following table details, by code symbol, the reference categories that can be displayed in the Search Results tab:

| Code Symbol | Reference Category |
|---|---|
| Class, inner class or interface | Ancestors - Classes from which this class directly inherits.<br>Descendents - Classes that directly descend from this class.<br>Type references - Classes that declare or instantiate the type of object for the class.<br>Descendents type references - Classes that are descendents or use descendents of the type of object for the class.<br>Member references - Members in this class.<br>Descendents member references - Members in classes that descend from this class. |
| Method or constructor | Declarations - Locations where this method is declared.<br>Direct usages - Locations in directly instantiated classes that call this method.<br>Indirect usages - Locations in ancestor and descendent classes that are referenced. |
| Field and local variable | Writes - Locations where the field or local variable is written.<br>Reads - Locations where the field or local variable is read. |

After references for a class have been located, a reference category in the Search Results tab may be selected to obtain additional information about that reference, including a list of the source files referring to the class. A user may then select a source file and a reference to go directly to the reference in the editor. Additional information on a method may be obtained in a similar fashion. For field or local variable references, the writes and reads for the selected symbol may be displayed.

5. Viewing Changes Before Refactoring

Before some types of refactoring are performed, the system provides the opportunity to view potential changes to be made before committing the refactoring. A user may wish to preview changes to ensure that the changes that will be made are appropriate before committing the changes. For instance, when the rename or move commands on the context menu are utilized, rename or move dialog boxes are displayed. These dialog boxes provide an option for viewing changes before committing them. If this preview option is selected, potential changes are displayed on the "Refactoring" tab of the message pane. The lines that will potentially change as a result of the refactoring are displayed by file name, sorted in the order of discovery. The following table details the type of information displayed for refactoring:

| Code Symbol | Type of refactoring | Information displayed |
|---|---|---|
| Package | Rename | Source files that contain a class reference that will change |
| Class, inner class or interface | Rename | Line locations in the current source file where the class is declared; includes constructors. Also lists source code locations where the class is used. |
| Class | Move | Source code locations where the class' current package is declared or imported. Indicates if a package in the list of imports is added or deleted. (An import statement is added for any dependencies the class has on the package it is being moved from). |

-continued

| Code Symbol | Type of refactoring | Information displayed |
|---|---|---|
| Method | Rename | Source code locations where the method is declared and used. Indicates if a forwarding method is created. |
| Field and local variable | Rename | Source code locations where the symbol is declared and called. |
| Property | Rename | Source code locations where the property is declared and where accompanying getter and setter are declared and called. |

A mapping is also provided which enables a user to go directly to a selected reference in a source file. After reviewing the changes, a user may issue a command (using the Refactoring tab) to commit the changes and complete the refactoring. A status bar displays a message providing information about the progress of the refactoring. If the files are edited before the refactoring is complete, the system may require the application to be recompiled, since the binary files (e.g. .class files) and the source files (i.e., .java files) would not be consistent. In this event, a status message is displayed indicating that the refactoring cannot be completed because the files have changed. When the refactoring is completed, a message is displayed indicating that the refactoring is complete.

After refactoring, the contents of the Refactoring tab do not change. The original lines of source code are still displayed, so that the changes made by the refactoring can be observed. A user may select an original source code line to go to the line that was changed. After the changes have been reviewed, they may be saved to make them permanent.

6. Performing Different Types of Refactoring a) Optimize imports

An optimize imports refactoring may be used to rewrite and reorganize import statements according to custom settings in the project properties. A user can customize the order of imports on the import style page of the "Project Properties" dialog box of the currently preferred embodiment. To customize the order of import statements for new projects, a "Project|Default Project Properties" dialog box may be used to make modifications to the import style page.

Different import style options may be set for the refactoring. An "Always Import Classes" option may be selected to avoid adding package import statements to an application. If this option is selected, individual classes will be directly imported. When this option is used, the "Package Import Threshold" is ignored. The "Package Import Threshold" sets how many classes must be imported from a package before rewriting the class import statement into a package import statement. Classes up to the import threshold are imported using individual class import statements. When the threshold is exceeded, the entire package is imported. For example, when three is entered in the import threshold field, and four or more classes are used from a package, the entire package will be imported.

b) Rename refactoring a package

A package may also be rename refactored from the editor or a UML class or package diagram. Rename refactoring a package renames the package and the entire subtree of packages to the new root package name. It also moves the package and all class names to the new name and source directory. A user may elect to view references before committing the rename refactoring of a package. After the refactoring is completed, the existing source directory structure for that package is deleted. The package rename refactoring is prevented by the system if the new package name already exists or is invalid.

c) Rename refactoring a class

A class, inner class, or interface can be rename refactored from either the editor or the UML class diagram. Rename refactoring for an outer public class renames all declarations of the class and all usages of the class and the source file. If a constructor is selected, the rename refactoring renames the class. The changes to be made in the refactoring may be previewed as described above, if desired. The rename refactoring is prevented by the system if the class identifier is invalid. In addition, if the class is not the outer public class and there is another non-outer public class of the desired new name, the class is not renamed.

d) Move refactoring a class

A class can be moved to a new package (i.e., move refactored) using the editor or the UML class diagram. Move refactoring a class moves that class to a new package if the new package does not already contain a source file of the new name. The package and import statements in the class source file, as well as in all classes that reference the moved class, are updated. An import statement is added for any dependencies the class has on the package it is being moved from. The class being moved must be the top level public class. The class is not moved if the class identifier is invalid or if the source file name already exists in the new package. If a class is moved to a package that does not exist, the new package is automatically created and added to the application or project. The system also creates the new source directory and moves the class to the new directory. Package names and import statements are also updated. Additionally, if the package no longer contains any classes, the package is removed from the project and its source directory is deleted.

e) Rename refactoring a method

A method may also be rename refactored. Rename refactoring of a method may be initiated from either the editor or a UML diagram of the development system. Rename refactoring a method renames the method, all declarations of that method, and all usages of that method. The method can be renamed in the entire hierarchy or from the selected class down in the hierarchy. A forwarding method, that passes on the method call to a new method, can also be created using a "Create Forwarding Method" option, allowing a public API to remain intact. Rename refactoring a method does not rename overloaded methods; that is, methods with the same name but with different method signatures. A "Refactor Ancestors" option, when enabled, renames methods in classes that the current class inherits from. This option may be deactivated to rename the method only in this class and in its descendents. Rename refactoring of a method is barred if the new method name already exists in the file where it is declared. If the name exists in other files in the direct inheritance, a warning is issued. If the refactoring is performed with the Refactor Ancestors option enabled, a warning is also be displayed if the method exists, but is not in the editable source path. For example, if the method exists in a library, the method will not be refactored, as libraries are read-only.

f) Rename refactoring a local variable

In the currently preferred embodiment, a local variable can be rename refactored only from the editor. A local variable rename refactoring changes the declaration and usages of that variable to the new name. A method parameter is also treated as a local variable for these purposes. The rename refactoring is prevented if the new name exists in the class that declared the original variable.

g) Rename refactoring a field

A field can be rename refactored from either the editor or a UML class diagram. A field rename refactoring changes the declarations and usages of that field to the new name. The refactoring may not be completed if the new name exists in the class that declared the field. If there are scope conflicts between the new name and the old name, the this keyword is added to the new field name. A warning is displayed if the new field overrides or is overridden by an existing field in a superclass or subclass.

h) Rename refactoring a property

A property can be renamed from a UML class diagram. A property rename refactoring changes all declarations of that property, as well as its getter and setter methods. A rename refactoring of a property cannot be completed if the new name exists in the class that declared the original property.

i) Changing method parameters

A user can also add, rename, delete, and reorder a method's parameters from the editor or from a UML diagram. A newly edited parameter can be edited before the "Change Parameters" dialog box is closed; however an existing parameter cannot be edited. The "Refactor Ancestors" option (on by default) refactors methods in classes from which this class inherits. The Refactor Ancestors option may be deactivated to refactor the method only in this class and in its descendents. A user can then choose to add a forwarding method by clicking the "Create Forwarding Method" option. A changing message parameters refactoring is prevented if the new method signature already exists in the file where it is declared. If the signature exists in other files in the direct inheritance, a warning is issued. If the refactoring is performed with the Refactor Ancestors option enabled, a warning can also be displayed if the same method exists, but is not in the editable source path. For example, if the method exists in a library, it will not be refactored, as libraries are read-only. In addition, the refactoring may be prevented if the new parameter name or type is not a valid Java identifier.

j) Extracting a method

An extract method refactoring turns a selected code fragment into a method. A user can access this refactoring from the editor. The extracted code is moved outside of the current method, the needed parameter(s) are determined, local variables are generated if necessary, and the return type is determined. A call to the new method is also inserted in the code where the code fragment resided. This refactoring may not be allowed if more than one variable is written to or if it is read after the block.

k) Introducing a variable

An introduce variable refactoring may be used to replace the result of a complex expression, or part of the expression, with a temporary variable name. The temporary name is also known as an explaining variable which explains the purpose of the expression or sub-expression. A temporary variable with the selected variable name is generated and initialized in the correct place. The original expression is replaced with the newly generated variable.

l) Surrounding a block with try/catch

A user can perform a surrounding a block with try/catch refactoring to place a try/catch statement around a selected block of code. The system will detect all checked exceptions in a block and adds specific blocks for each checked exception. This refactoring is available from the editor. If the selected block is not a valid block of statements, an error will be displayed in the refactoring tab and the refactoring will be prevented.

7. Undoing a Refactoring

A completed refactoring operation can be easily reversed. In the currently preferred embodiment, an "Undo" button is provided on the refactoring toolbar to undo all changes made in a refactoring. The refactoring should be reversed before any changes are made to other files and before the Refactoring tab is closed. When a refactoring is performed that does not display output in the Refactoring tab, changes can be reversed with an "Edit|Undo" command.

8. Saving Refactoring

After a refactoring has been successfully completed, the changes may be saved (i.e., the modified files in the software system may be saved) using a "File|Save All" command. If a version control system is utilized, the changes may be committed or checked into the version control system. If the software system is closed before the refactoring changes are saved, a "Save Modified Files" dialog box is displayed enabling the files that are to be saved to be selected. If the refactored files are not saved, the software system source files revert to their state before the refactoring(s). It should be noted that refactoring can be applied to files that may not be open in the editor at the time of the refactoring. The system automatically saves changes to those files so the source code is not in an inconsistent state.

E. Detailed methods of operation

Figure 6A:
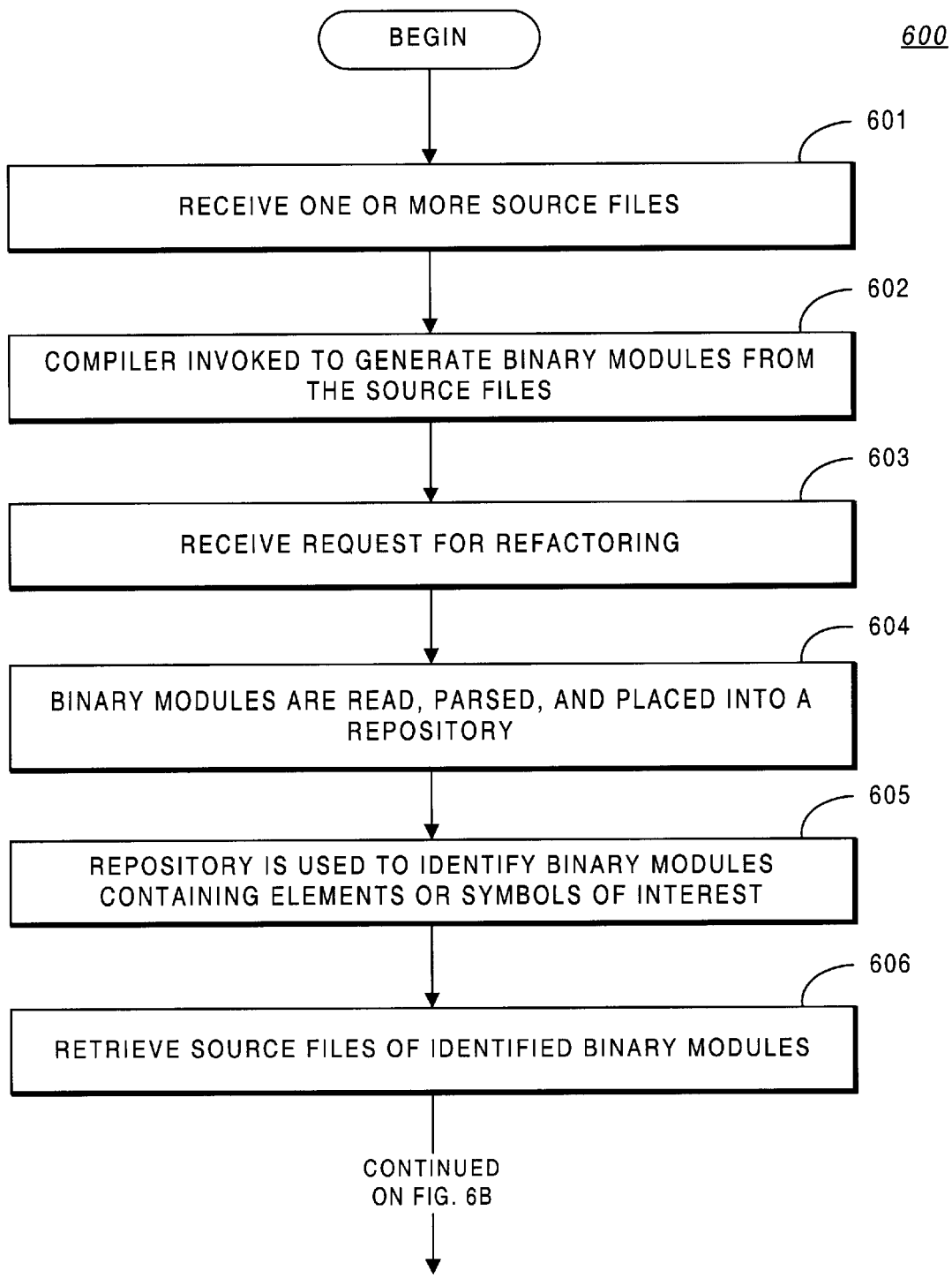
FIGS. 6A–B comprise a single flowchart illustrating a compiler-assisted refactoring method performed in accordance with the present invention.
Figure 6B:
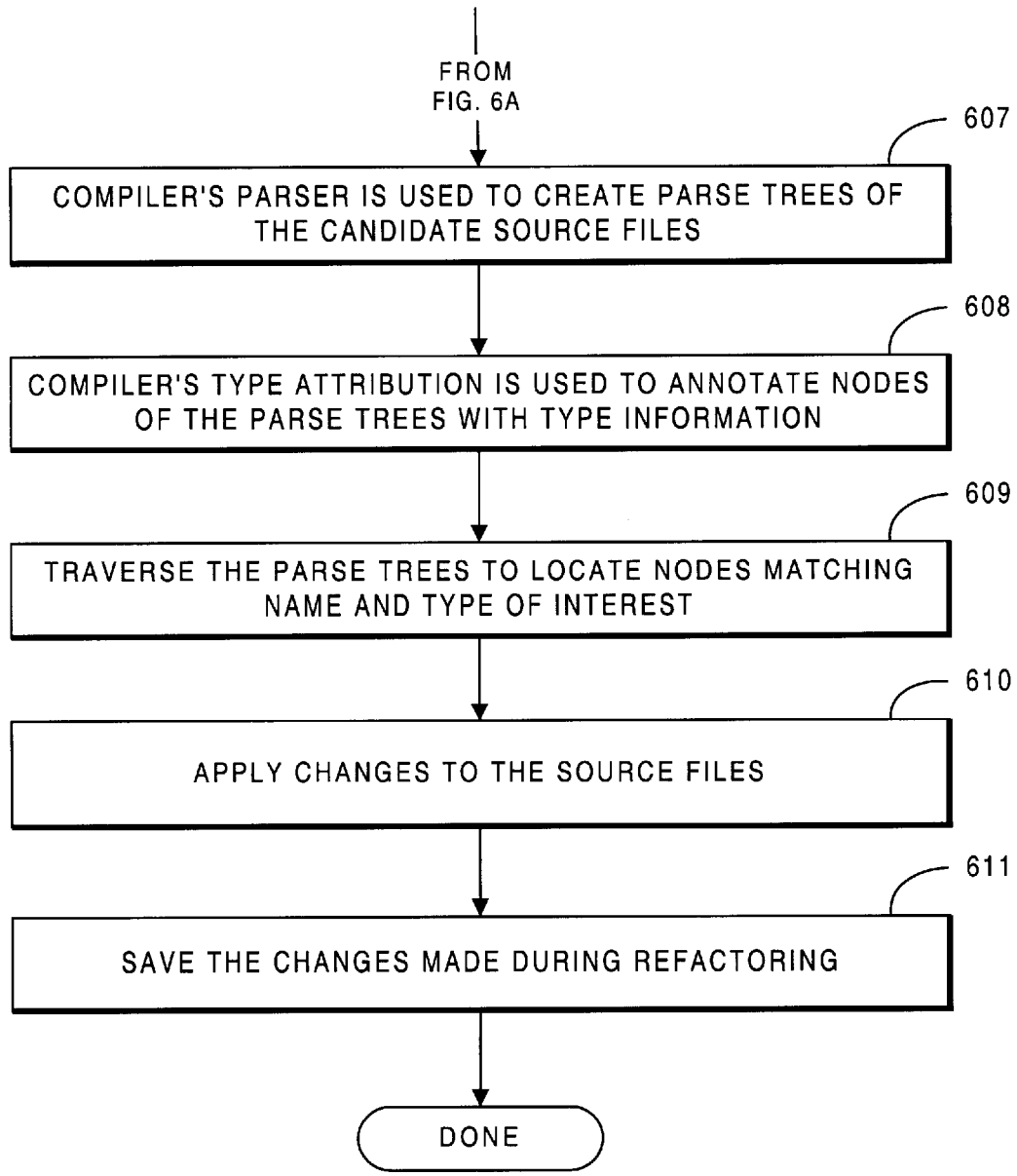

FIGS. 6A–B comprise a single flowchart illustrating a compiler-assisted refactoring method 600 performed in accordance with the present invention. To illustrate the operation of the present invention, FIGS. 6A–B and the following discussion use as an example a refactoring of a software application written in the Java language containing a number of component source files or programs. However, Java is only one of the possible programming languages with which the present invention may be advantageously utilized. Accordingly, the references to Java in the following discussion are for purposes of illustration and not limitation. In addition, refactoring of a software system may involve applying a number of different changes to the system (e.g., changing a number of different symbols or class names). Accordingly, the steps described below for making a given change may be repeated for applying a number of different changes to a software system, as desired.

The method begins at step 601 with the receipt of one or more source file(s) that have been developed or created to perform particular tasks. The source files may, for instance, comprise .java files for a software application that has been developed in the Java programming language for installation on a particular environment (e.g., an e-commerce application to be installed on a Web server). At step 602, the compiler is initially invoked to compile these source file(s) into a set of binary files (e.g., .class files). The compilation process includes parsing the source files, applying type attribution, and generating binary code (e.g., Java bytecode) as previously described. It should be noted that in the case of Java source files, the name of the source files (e.g., class names) as well as other reference information is retained as part of these compiled .class files. The result of the compilation process is that the source files (e.g., .java files) have been translated into machine readable binary code (e.g., .class files) which may then be executed.

After the source file(s) have been compiled, a user may subsequently wish to make changes to the application. For instance, a user may want to perform a rename refactoring to change a particular class name of a component of the application. At step 603, a request is received from a user for refactoring of a program or system. In response to this request, at step 604 the system of the present invention reads and parses the binary modules of the application in order to place entries into a repository. In particular, the above binary files (e.g., .class files) of the application developed or created by the user are examined and the system of the present invention generates information about each binary file (e.g., .class file) and places this information in the repository. In the currently preferred embodiment, information that is placed into the repository includes the element name (e.g., the class name), the source file, and the forward references from this class to other classes. The above process examines the user-developed .class files and does not examine standard libraries and other standard files or components provided as part of the underlying Java programming language.

After the user source files of the application have been examined and entries have been placed in the repository describing each of the components of the application, at step 605 the information in the repository is used to identify binary files which may contain dependencies (i.e., which may contain the elements or symbols of interest such as the class name in this example). This process involves using the forward references in the repository to isolate candidate binary files (e.g., .class files) which may contain dependencies. At step 606, the corresponding source files are retrieved for the candidate binary files identified at step 605.

After the candidate source files have been retrieved, at step 607 these source files are read into the compiler. The compiler is used to parse the candidate source files (i.e., those identified at step 606) and create parse trees representations of these source files. The parse tree representations of the candidate source files that are generated contain short names (e.g., text names) and position information which references the locations of these short names (or symbols), but do not yet contain type information. At step 608, the compiler's type attribution is used to annotate nodes of these parse trees with type information. More particularly, each node of the parse tree includes a field for storing type information. The compiler adds type information to nodes of the parse tree by traversing (or walking) the parse tree and building look-up tables based upon the surrounding environment (e.g., local variables of a method in which the short name is located). This type information is necessary to enable the short name to be tested to determine whether the short name is, in fact, a local variable or another class or method from outside the local context (i.e., a dependency on another class). Steps 607 and 608 are similar to the previously described compilation process used to generate the binary files, except in this situation only the substeps of parsing the source files and type attribution are used. The substep of code generation is unnecessary. At the completion of the type attribution process, the parse tree representations of the candidate source files include short names (or symbols), type names, and position information.

At step 609, the annotated parse trees are traversed to locate nodes that match the short name(s) and type(s) of interest. The position and line number of the matching nodes can then be obtained from the repository. The position information (i.e., the line number in the source file in which the matching node is located) is used to locate this code in the appropriate source file. At step 610, the modifications are applied to to the underlying source files (i.e., modifications to the textual form of the source code). After the modifications are applied to the underlying source files, the refactoring is complete. The user can then save the changes made during the refactoring at step 611. For most types of refactoring, the currently preferred embodiment enables the changes made during the refactoring to be viewed by the user before the changes are saved. After the changes have been saved, the user may, if desired, recompile the source code to verify successful refactoring and update the binary files. The user may also proceed to make additional modifications to the application, which may include repeating the above steps for refactoring another element of the application.

While the invention is described in some detail with specific reference to a single-preferred embodiment and certain alternatives, there is no intent to limit the invention to that particular embodiment or those specific alternatives. For instance, the foregoing discussion uses a refactoring of a software application written in the Java language to illustrate the operations of the present invention. However, Java is only one of the possible programming languages with which the present invention may be advantageously utilized. Accordingly, the references to refactoring a Java application in the foregoing discussion are for purposes of illustration and not limitation. Those skilled in the art will appreciate that modifications may be made to the preferred embodiment without departing from the teachings of the present invention.

What is claimed is:

1. A method for locating dependencies to source code changes to a software system, the method comprising:

receiving a source code change to the software system;

parsing binary modules of the software system to determine which binary modules contain dependencies to said source code change;

retrieving corresponding source files of said binary modules; and using a compiler to identify each dependency present in the retrieved source code.

2. The method of claim 1, further comprising:

modifying each dependency based upon said source code change.

3. The method of claim 1, wherein said binary modules comprise compiled Java bytecode.

4. The method of claim 1, wherein said binary modules comprise Java .class files.

5. The method of claim 1, wherein said parsing step includes placing information about each binary module in a repository.

6. The method of claim 5, wherein the information placed in the repository includes a particular binary module containing the source code change and other binary modules which reference this particular binary module.

7. The method of claim 1, wherein said step of using a compiler to identify each dependency includes the substeps of:

parsing the source files to create parse tree representations of the source files; and applying type attribution to annotate nodes of the parse tree representations with type information.

8. The method of claim 7, further comprising:

annotating the parse tree representations with position information for each dependency in the source files.

9. The method of claim 7, further comprising:

traversing the parse tree representations to identify each dependency.

10. The method of claim 1, further comprising:

providing short name, type information, and position information for each dependency.

11. The method of claim 1, further comprising:

providing a mapping to each dependency to enable a user to navigate to each dependency.

12. The method of claim 1, wherein said step of using a compiler to locate each dependency includes using a compiler used for development of the software system.

13. The method of claim 1, wherein said step of using a compiler to locate each dependency includes using a Java compiler.

14. The method of claim 1, wherein the source code change includes a selected one of package name, class name, interface, method, field, variable, and property.

15. A computer-readable medium having computer-executable instructions for performing the method of claim 1.

16. A downloadable set of computer-executable instructions for performing the method of claim 1.

17. An improved method for compiler-assisted refactoring of a software application, the method comprising:
  receiving a request for refactoring of a software application, said refactoring comprising a change to a given symbol of the software application;
  parsing binary files of the software application to identify the binary files containing references to the given symbol;
  retrieving source files of the identified binary files;
  using a compiler to generate a list of uses of the given symbol in the software application, said list including name, type information, and location of the given symbol; and
  applying changes to the software application based on said list of uses.

18. The method of claim 17, further comprising:
  displaying the changes applied to the software application; and
  in response to a user command, saving the applied changes.

19. The method of claim 17, wherein said parsing step includes generating a list of all binary files containing references to the given symbol.

20. The method of claim 17, wherein the given symbol includes a selected one of package name, class name, interface, method, field, variable, and property.

21. The method of claim 17, wherein said parsing step includes the substeps of:
  determining a particular binary module defining the given symbol; and
  determining all other binary modules referencing said particular binary module.

22. The method of claim 17, wherein said step of using a compiler to generate a list of uses includes the substeps of:
  using the compiler to parse the source files of the identified binary files to locate all references to the given symbol; and
  using the compiler for type attribution of the located references.

23. The method of claim 17, wherein said list of uses includes an annotated parse tree containing text name, type information, and position information.

24. The method of claim 17, further comprising:
  providing a mapping to the location of each given symbol in each source file facilitating access to each given symbol.

25. The method of claim 17, wherein said compiler used for the compiler-assisted refactoring method is a compiler used to develop the software application.

26. A computer-readable medium having computer-executable instructions for performing the method of claim 17.

27. A downloadable set of computer-executable instructions for performing the method of claim 17.

28. A method for assisting a user with changing source code for a software program, the method comprising:
  receiving a user-provided change to the source code for said software program;
  parsing binary modules of the software program to determine which particular binary modules are dependent on said user-provided change;
  retrieving corresponding source files of the binary modules for those particular binary modules determined to be dependent on said user-provided change; and
  with a compiler, identifying each particular portion of the source code in the retrieved source code files that is affected by said user-provided change.

29. The method of claim 28, further comprising:
  automatically applying changes to said each particular portion of the source code affected by said user provided change.

30. The method of claim 28, wherein said binary modules comprise compiled Java bytecode.

31. The method of claim 28, wherein said parsing step includes placing information about each binary module in a repository.

32. The method of claim 31, wherein the information placed in the repository includes a particular binary module containing said user-provided change and other binary modules which reference this particular binary module.

33. The method of claim 31, wherein the information in the repository is used to retrieve source files dependent on the binary module containing said user-provided change.

34. The method of claim 28, wherein said step of identifying each particular portion of source code includes the substeps of:
  parsing the source files to create parse tree representations of the source files;
  applying type attribution to annotate nodes of the parse tree representations with type information; and
  traversing the parse tree representations to identify each particular portion affected by said user-provided change.

35. The method of claim 28, further comprising:
  providing short name, type information, and position information for each particular portion of the source code affected by said user-provided change.

36. The method of claim 28, further comprising:
  providing a mapping to each particular portion of the source code affected by said user provided change.

37. A computer-readable medium having computer-executable instructions for performing the method of claim 28.

38. A downloadable set of computer-executable instructions for performing the method of claim 28.

39. A system for facilitating a modification to source code of a software program, the system comprising:
  a compiler for compiling source code into binary modules that comprise said software program;
  a refactoring module for:
    parsing the binary modules of said software program to determine which particular binary modules are dependent on said modification to source code;
    retrieving the source code of the particular binary modules dependent on said modification; and invoking the compiler for identifying particular portions of the retrieved source code affected by said modification.

40. The system of claim 39, further comprising:

applying said modification to said particular portions of the retrieved source code.

41. The system of claim 39, wherein said binary modules comprise compiled Java bytecode.

42. The system of claim 39, wherein said parsing step includes placing information about each binary module in a repository.

43. The system of claim 42, wherein the information in the repository includes a particular binary module containing said modification and other binary modules which reference this particular binary module.

44. The system of claim 39, wherein the information in the repository is used to retrieve source files dependent on the binary module containing said modification.

45. The system of claim 39, wherein invoking the compiler includes using the compiler for type attribution of said particular portions of the retrieved source code.

46. The system of claim 39, wherein the compiler, when invoked by the refactoring module, performs the steps of:

creating parse tree representations of the retrieved source code;

annotating the parse tree representations with type information; and traversing the annotated parse tree representations to identify each particular portion of the retrieved source code affected by said modification.

47. The system of claim 39, further comprising:

providing a mapping to each identified particular portion of the source code affected by said modification.

* * * * *